(12) United States Patent
Jin

(10) Patent No.: US 10,496,999 B2
(45) Date of Patent: Dec. 3, 2019

(54) METHOD AND APPARATUS OF CONTROLLING NETWORK PAYMENT

(71) Applicant: Alibaba Group Holding Limited, Grand Cayman (KY)

(72) Inventor: Jianwei Jin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 998 days.

(21) Appl. No.: 14/805,293

(22) Filed: Jul. 21, 2015

(65) Prior Publication Data
US 2016/0034861 A1    Feb. 4, 2016

(30) Foreign Application Priority Data

Jul. 31, 2014   (CN) .......................... 2014 1 0374084

(51) Int. Cl.
*G06Q 20/40*     (2012.01)
*G06Q 20/22*     (2012.01)
(Continued)

(52) U.S. Cl.
CPC ......... *G06Q 20/405* (2013.01); *G06Q 20/227* (2013.01); *G06Q 20/36* (2013.01); *G06Q 30/0601* (2013.01); *G06Q 30/0613* (2013.01)

(58) Field of Classification Search
CPC . G06Q 20/36; G06Q 30/0601; G06Q 30/0613
See application file for complete search history.

(56) References Cited

U.S. PATENT DOCUMENTS

| 5,058,162 A | * | 10/1991 | Santon | G06F 21/10 380/281 |
| 6,932,268 B1 | * | 8/2005 | McCoy | G06Q 20/02 235/379 |

(Continued)

FOREIGN PATENT DOCUMENTS

| CN | 101960761 A | 1/2011 |
| CN | 102341817 A | 2/2012 |

(Continued)

OTHER PUBLICATIONS

Kim, Modeling of Policy-based mobile payment, 2004, IEEE, 6th International Conference on Advanced communication technology. p. 1009-1011 (Year: 2004).*

(Continued)

*Primary Examiner* — Kito R Robinson
*Assistant Examiner* — Abdulmajeed Aziz
(74) *Attorney, Agent, or Firm* — Lee & Hayes, P.C.

(57) ABSTRACT

Methods and apparatuses of controlling a network payment are disclosed, which obtain a payment record when a selection of a payment instrument is needed, and determine a preferred payment instrument for a current transaction based on the payment record. By analyzing the payment record, a payment success rate of each payment instrument supported by a current payer under a current business scenario may be obtained, and a payment instrument having a maximum payment success rate may be set as the preferred payment instrument for the current transaction. The embodiments of the present disclosure therefore are able to implement an automatic selection of a payment instrument, reduce manual operations of a payer, simplify a payment process, and improve the payment efficiency and the transaction efficiency. In addition, using a payment instrument having a maximum payment success rate as a preferred payment instrument for a transaction may improve a success prob- (Continued)

ability of a one-time payment, thus avoiding the need of re-selecting a new payment instrument and thereby improving the payment efficiency and the transaction efficiency.

6 Claims, 12 Drawing Sheets

(51) Int. Cl.
    *G06Q 20/36* (2012.01)
    *G06Q 30/06* (2012.01)

(56) References Cited

U.S. PATENT DOCUMENTS

| | | | | |
|---|---|---|---|---|
| 7,502,760 | B1* | 3/2009 | Gupta | G06Q 20/367 |
| | | | | 705/64 |
| 7,599,884 | B2* | 10/2009 | van Leeuwen | G06Q 40/02 |
| | | | | 705/39 |
| 7,958,050 | B2* | 6/2011 | Finch | G06Q 20/10 |
| | | | | 705/40 |
| 8,050,997 | B1* | 11/2011 | Nosek | G06Q 20/023 |
| | | | | 705/37 |
| 2004/0024703 | A1* | 2/2004 | Roskind | G06Q 20/02 |
| | | | | 705/40 |
| 2004/0169073 | A1 | 9/2004 | Goldberg et al. | |
| 2004/0193552 | A1* | 9/2004 | Ikenaga | G06Q 10/02 |
| | | | | 705/75 |
| 2005/0086130 | A1* | 4/2005 | Crossgrove | G06Q 30/02 |
| | | | | 705/26.41 |
| 2007/0246528 | A1* | 10/2007 | Kubo | G06Q 20/04 |
| | | | | 235/380 |
| 2009/0037294 | A1* | 2/2009 | Malhotra | G06Q 30/06 |
| | | | | 705/26.1 |
| 2011/0196786 | A1* | 8/2011 | Lacerte | G06Q 20/102 |
| | | | | 705/40 |
| 2012/0197795 | A1* | 8/2012 | Campbell | G06Q 30/04 |
| | | | | 705/42 |
| 2012/0209768 | A1* | 8/2012 | Nuzzi | G06Q 40/02 |
| | | | | 705/44 |
| 2012/0276870 | A1* | 11/2012 | Davis | G06O 20/123 |
| | | | | 455/407 |
| 2012/0310760 | A1 | 12/2012 | Phillips et al. | |
| 2012/0323669 | A1 | 12/2012 | Kohlmeier | |
| 2013/0046655 | A1 | 2/2013 | Karkera et al. | |
| 2013/0085936 | A1* | 4/2013 | Law | G06O 20/04 |
| | | | | 705/40 |
| 2013/0191227 | A1 | 7/2013 | Pasa et al. | |
| 2013/0311369 | A1* | 11/2013 | Elrod | G06O 20/4016 |
| | | | | 705/44 |
| 2013/0325722 | A1 | 12/2013 | Mohan et al. | |
| 2014/0081729 | A1* | 3/2014 | Ocher | G06Q 30/0222 |
| | | | | 705/14.23 |
| 2014/0108251 | A1* | 4/2014 | Anderson | G06Q 20/4016 |
| | | | | 705/44 |
| 2014/0129357 | A1 | 5/2014 | Goodwin | |
| 2014/0180924 | A1* | 6/2014 | Ozvat | G06Q 20/20 |
| | | | | 705/44 |

FOREIGN PATENT DOCUMENTS

| | | |
|---|---|---|
| CN | 103093340 A | 5/2013 |
| CN | 103337020 A | 10/2013 |
| CN | 103413216 A | 11/2013 |
| CN | 103577985 A | 2/2014 |
| JP | 2007102319 | 4/2007 |
| JP | 2012532368 A | 12/2012 |
| KR | 1020060098023 | 9/2006 |

OTHER PUBLICATIONS

Extended Euorpean Search Report dated Dec. 6, 2017 for European patent application No. 15827780.6, 6 pages.
PCT Search Report and Written Opinion dated Oct. 9, 2015 for PCT Application No. PCT/US15/41399, 7 pages.
First Chinese Office Action dated Aug. 2, 2018 for Chinese patent application No. 201410374084.5, a foreign counterpart application of U.S. Appl. No. 14/805,293, 6 pages.
Second Chinese Office Action dated Sep. 28, 2018 for Chinese patent application No. 201410374084.5, a foreign counterpart application of U.S. Appl. No. 14/805,293, 8 pages.
First Chinese search report for Chinese patent application No. 201410374084.5 dated Jul. 20, 2018, 2 pages.
Japanese Office Action dated Apr. 2, 2019 for Japanese Patent Application No. 2016-573881, a counterpart of U.S. Appl. No. 14/805,293, 12 pages.
English Translation of the Korean Office Action dated Jul. 18, 2019 for Korean patent application No. 2017-7001790, a foreign counterpart application of U.S. Appl. No. 14/805,293, 6 pages.

* cited by examiner

METHOD AND APPARATUS OF CONTROLLING NETWORK PAYMENT

CROSS REFERENCE TO RELATED PATENT APPLICATION

This application claims foreign priority to Chinese Patent Application No. 201410374084.5 filed on Jul. 31, 2014, entitled "Method and Apparatus of Controlling Network Payment", which is hereby incorporated by reference in its entirety.

TECHNICAL FIELD

The present disclosure relates to the technological field of Internet applications, and in particular, to methods and apparatuses of controlling a network payment.

BACKGROUND

Along with the rapid economic development and the development of network technologies, online shopping has become one of the major shopping channels for consumers. The number of payment instruments for network transactions has increased, e.g., Alipay, Kuaiqian, and electronic banking of various banks, etc., so that a transaction between a payer and a payee has become more convenient and efficient.

In a real application, multiple types of payment instruments supported by the same business scenario, a same payee or a same payer usually exist. Therefore, prior to making each payment, a payer needs to make a selection among various types of payment instruments, and complete a current payment using a selected payment instrument.

Although the aforementioned method of controlling a network payment may meet consumption habits of different payers, operations are complicated and do not facilitate an improvement of transaction efficiency as a payer needs to select a payment instrument prior to each payment.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Embodiments of the present disclosure provide a method and an apparatus of controlling a network payment to solve problems associated with the complicated operations and the low transaction efficiency of manual selection of a payment instrument by a payer in existing methods.

In order to solve the above technical problem, the embodiments of the present disclosure disclose the following technical solutions:

In a first aspect, the embodiments of the present disclosure provide a method of controlling a network payment. The method may include obtaining a payment record when multiple types of payment instruments that are able to complete a transaction exist, and setting a preferred payment instrument for the transaction based on the obtained payment record. In an embodiment, setting the preferred payment instrument for the transaction based on the obtained payment record may include analyzing the payment record to obtain respective payment success rates of the payment instruments supported by a current payer under a current business scenario, comparing the payment success rates, and setting a payment instrument having a maximum payment success rate as the preferred payment instrument of the transaction.

In an implementation, obtaining the payment record may include obtaining a first payment record of payment completion by the current payer under the current business scenario.

In an implementation, obtaining the payment record may further include obtaining second payment records of all payers under the current business scenario in response to failing to obtain the first payment record.

In an implementation, obtaining the payment record may further include obtaining a third payment record associated with payment completion by the current payer under any business scenario in response to failing to obtain the first payment record; and obtaining second payment records of all payers under the current business scenario in response to failing to obtain the third payment record.

In an implementation, setting the preferred payment instrument of the transaction based on the obtained payment record may further include setting a payment instrument used by the payer in a latest transaction with a successful payment under the current business scenario as the preferred payment instrument of the transaction based on the first payment record if the first payment record is obtained.

In an implementation, the method of controlling the network payment may further include storing a payment record of the transaction upon completion of the transaction.

In a second aspect, the embodiments of the present disclosure provide a network payment control apparatus. The apparatus may include: an acquisition unit to obtain a payment record when multiple types of payment instruments that are able to complete the transaction exist; a determination unit to set a preferred payment instrument for the transaction based on the obtained payment record.

In an embodiment, the determination unit may include an analysis unit to analyze the payment record to obtain respective payment success rates of the payment instruments supported by a payer under a current business scenario; and a first determination subunit to compare the respective payment success rates, and to set a payment instrument having a maximum payment success rate as the preferred payment instrument of the transaction.

In an implementation, the acquisition unit may include a first acquisition subunit to obtain a first payment record of payment completion by the payer under the current business scenario when the multiple types of payment instruments that are able to complete the transaction exist.

In an implementation, the acquisition unit may further include a second acquisition subunit to obtain second payment records of all payers under the current business scenario in response to failing to obtain the first payment record.

In an implementation, the acquisition unit may further include a third acquisition subunit to obtain a third payment record of payment completion by the payer under any business scenario in response to failing to obtain the first payment record is failed; and a fourth acquisition subunit to obtain second payment records of all payers under the current business scenario in response to failing to obtain the third payment record.

In an implementation, the determination unit may further include a second determination subunit to set a payment instrument used by the payer in a latest transaction with a successful payment under the current business scenario as the preferred payment instrument of the transaction based on the first payment record if the first payment record is obtained.

In an implementation, the network payment control apparatus may further include a storage unit to store a payment record of the transaction upon completion of the transaction.

As can be seen from the above technical solutions, the embodiments of the present disclosure obtain a payment record when a selection of a payment instrument is needed, and set a preferred payment instrument of a transaction based on the payment record. Specifically, a payment success rate of each payment instrument supported by a payer under a current business scenario may be obtained by analyzing the payment record, and a payment instrument having a maximum payment success rate is set as the preferred payment instrument of the transaction. Therefore, the embodiments of the present disclosure can implement an automatic selection of a payment instrument, reduce manual operations of a payer, simplify a payment process, and improve payment efficiency and transaction efficiency. In addition, using the payment instrument having the maximum payment success rate as the preferred payment instrument of the transaction may improve a success probability of a one-time payment to avoid a re-selection of payment instrument, thereby improving the payment efficiency and the transaction efficiency.

DESCRIPTION OF THE DRAWINGS

In order to describe the technical solutions in the embodiments of the present disclosure or existing technologies more clearly, the accompanying drawings are briefly described herein. Apparently, one of ordinary skill in the art may still derive other drawings from these accompanying drawings without making any creative effort.

DETAILED DESCRIPTION

In order for one skilled in the art to understand the technical solutions in the present disclosure in a better manner, the technical solutions in the embodiments of the present disclosure are described clearly and completely in conjunction with the accompanying drawings in the embodiments of the present disclosure. Apparently, the described embodiments merely represent a part and not all of the embodiments of the present disclosure. All other embodiments obtained by one of ordinary skill in the art based on the embodiments of the present disclosure without making any creative effort shall fall within the scope of protection of the present disclosure.

Figure 1:
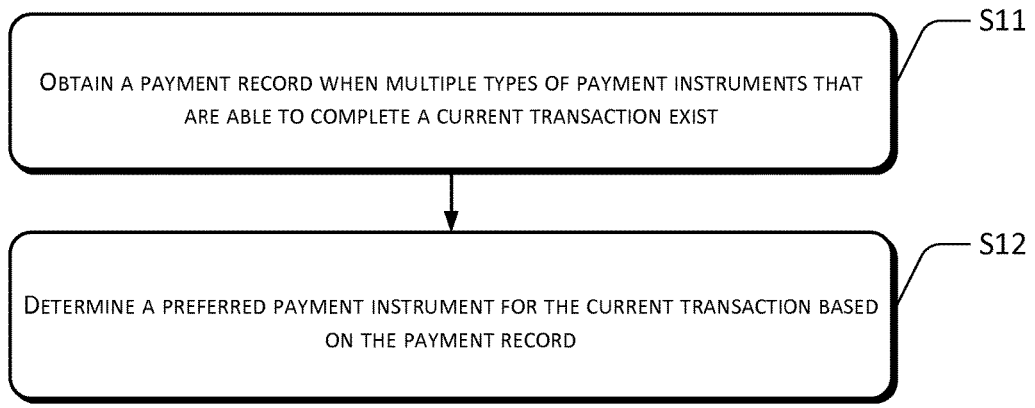
FIG. 1 is a flowchart illustrating a first example method of controlling a network payment in accordance with an embodiment of the present disclosure.

FIG. 1 is a flowchart illustrating a first method of controlling a network payment control in accordance with an embodiment of the present disclosure.

Referring to FIG. 1, the method of controlling a network payment includes the following method blocks:

S11 obtains a payment record when multiple types of payment instruments that are able to complete a transaction exist.

S12 determines a preferred payment instrument of the transaction based on the payment record.

In an embodiment of the present disclosure, determining a preferred payment instrument of the transaction based on the payment record may include analyzing the payment record to obtain a payment success rate of each payment instrument supported by a payer under a current business scenario; comparing the payment success rates, and determining a payment instrument having a maximum payment success rate as the preferred payment instrument of the transaction. The payment record may be stored in a database of a server.

The payment record is payment information associated with transaction(s), and includes at least business scenario(s), payment instrument(s) used, and payment status(es) (successful or failed). For example, Table 1 shows an example of the payment record under the current business scenario (numbered 001) obtained at S11, where payment instruments A, B and C are all payment instruments supported by the payer.

TABLE 1

Payment record

| Serial Number | Transaction Scenario Number | Payment Instrument | Payment Status |
|---|---|---|---|
| 1 | 001 | A | Successful |
| 2 | 001 | A | Successful |
| 3 | 001 | B | Successful |
| 4 | 001 | B | Successful |
| 5 | 001 | B | Failed |
| 6 | 001 | B | Successful |
| 7 | 001 | C | Successful |
| 8 | 001 | C | Successful |
| 9 | 001 | C | Successful |
| 10 | 001 | C | Successful |

In the above ten pieces of transaction records, a payment success rate of payment instrument A is 20%, a payment success rate of payment instrument B is 30%, and a payment success rate of payment instrument C is 40%.

According to Table 1, the preferred payment instrument of the transaction may be determined to be payment instrument C.

As can be seen from the above technical solutions, the embodiments of the present disclosure obtain a payment record when a selection of a payment instrument is needed, and set a preferred payment instrument of a transaction based on the payment record. Specifically, a payment success rate of each payment instrument supported by a payer under a current business scenario may be obtained by analyzing the payment record, and a payment instrument having a maximum payment success rate is set as the preferred payment instrument of the transaction. Therefore, the embodiments of the present disclosure are able to implement an automatic selection of a payment instrument, reduce manual operations of a payer, simplify a payment process, and improve payment efficiency and transaction efficiency. In addition, using the payment instrument having the maximum payment success rate as the preferred payment instrument of the transaction may improve a success probability of a one-time payment to avoid a re-selection of payment instrument, thereby improving the payment efficiency and the transaction efficiency.

The above technical solutions can implement an automatic selection of a payment instrument when multiple types of payment instruments that are able to complete a transaction exist. If only one payment instrument that is able to complete the transaction exists, that payment instrument is used directly as the preferred payment instrument of the transaction.

In order to facilitate the description, all payment instruments supported in a business scenario corresponding to a transaction are assumed to form a set W1, and all payment instruments supported by a payer of the transaction are assumed to form a set W2. In an embodiment of the present disclosure, a determination may be made as to whether multiple types of payment instruments that are able to complete the transaction exist using three conditions as follows:

a first condition: the number of elements in W1 is not less than two;

a second condition: the number of elements in W2 is not less than two; and a third condition: the number of elements in an intersection (W1∩W2) between W1 and W2 is not less than two.

When these three conditions are all satisfied, a determination may be made that multiple types of payment instruments that are able to complete the transaction exist. When at least one of the above three conditions is not satisfied, a determination may be made that only one payment instrument that is able to complete the transaction exists.

Figure 2:
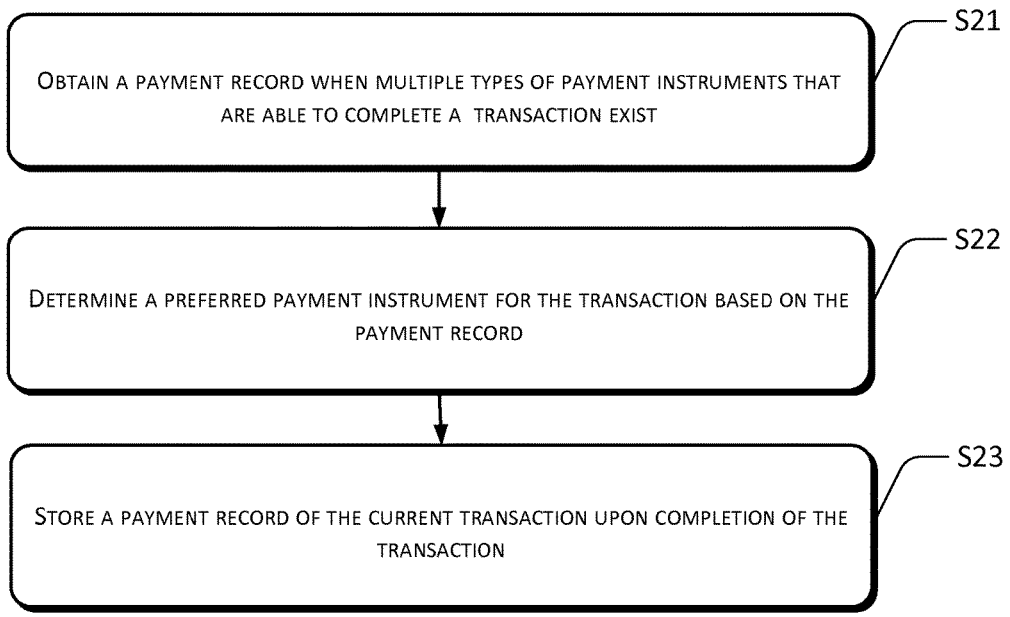
FIG. 2 is a flowchart illustrating a second example method of controlling a network payment in accordance with an embodiment of the present disclosure.

FIG. 2 is a flowchart illustrating a second method of controlling a network payment in accordance with an embodiment of the present disclosure.

Referring to FIG. 2, the method of controlling a network payment includes the following method blocks:

S21 obtains a payment record when multiple types of payment instruments that are able to complete a transaction exist.

S22 determines a preferred payment instrument for the transaction based on the payment record.

S23 stores a payment record of the transaction upon completion of the transaction.

Information in the payment record may include a business scenario of the transaction, a payee, a payment instrument, and a payment status (successful payment or failed payment), and may further include other related information, such as payee information, etc.

The completion of the transaction may include any of the following transaction results:

1) A payer makes a payment via a payment instrument having a maximum payment success rate, and the payment is successful;

2) The payer makes the payment via the payment instrument having the maximum payment success rate, the payment is failed, and the transaction is canceled;

3) The payer makes the payment via the payment instrument having the maximum payment success rate, the payment is failed, and a successful payment is made via another payment instrument that is manually selected; and 4) The payer does not use the payment instrument having the maximum payment success rate, and manually changes to another payment instrument via which a successful payment is made.

The payment record of the transaction, after being stored, may be used as a reference of analysis for subsequent transactions. The more the number of payment records are stored, the higher the payment success rate of the determined payment instrument will be.

Figure 3:
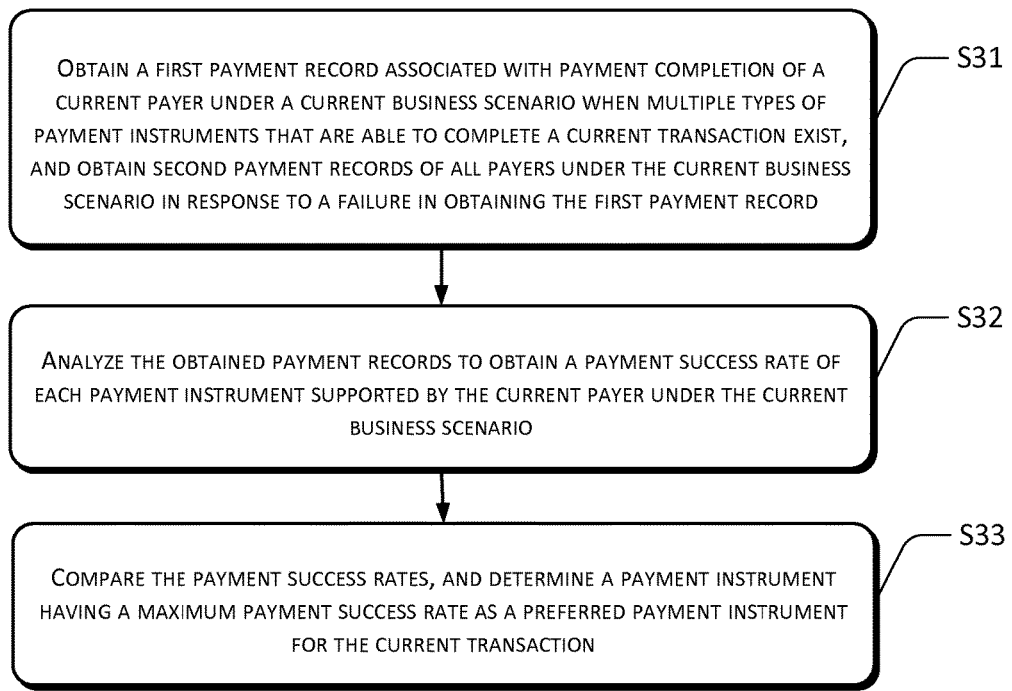
FIG. 3 is a flowchart illustrating a third example method of controlling a network payment in accordance with an embodiment of the present disclosure.

FIG. 3 is a flowchart illustrating a third method of controlling a network payment in accordance with an embodiment of the present disclosure.

Referring to FIG. 3, the method of controlling a network payment includes the following method blocks:

S31 obtains a first payment record associated with payment completion of a current payer under a current business scenario when multiple types of payment instruments that are able to complete a current transaction exist, and obtains second payment records of all payers under the current business scenario in response to a failure in obtaining the first payment record.

If the business scenario of the current transaction is a "credit card payment", and the current payer is a "user", each transaction in the first payment record satisfies the following conditions: a payer thereof is the "user" and a business scenario thereof is the "credit card payment". As can be seen, a payment instrument of each transaction in the first payment record corresponds to a payment instrument that is able to complete the current transaction.

For a payer who makes a transaction under the current business scenario for the first time, an attempt to obtain the first payment record fails because no first payment record satisfying the condition exists. In this case, the preferred payment instrument of the transaction is determined using payment records of other payers under the current business scenario, i.e., the second payment records, as a basis for reference.

S32 analyzes the obtained payment records to obtain a payment success rate of each payment instrument supported by the current payer under the current business scenario.

If the first payment record is obtained, the first payment record is used as an analysis object. If the second payment records are obtained, the second payment records are used as analysis objects.

S33 compares the payment success rates, and determines a payment instrument having a maximum payment success rate as a preferred payment instrument for the current transaction.

This embodiment of the present disclosure determines a preferred payment instrument for a current transaction using a first payment record as a basis for reference, and is able to avoid a phenomenon that a finally determined payment instrument is not supported by a payer or a business scenario of the current transaction, thus ensuring that the finally determined payment instrument for the current transaction has the maximum payment success probability. When the first payment record does not exist, the preferred payment instrument for the transaction is determined using second payment records of other payers under the current business scenario as a basis for reference. Because of the existence of the second payment records, a phenomenon that the preferred payment instrument for the transaction cannot be determined due to a lack of reference basis does not occur.

Figure 4:
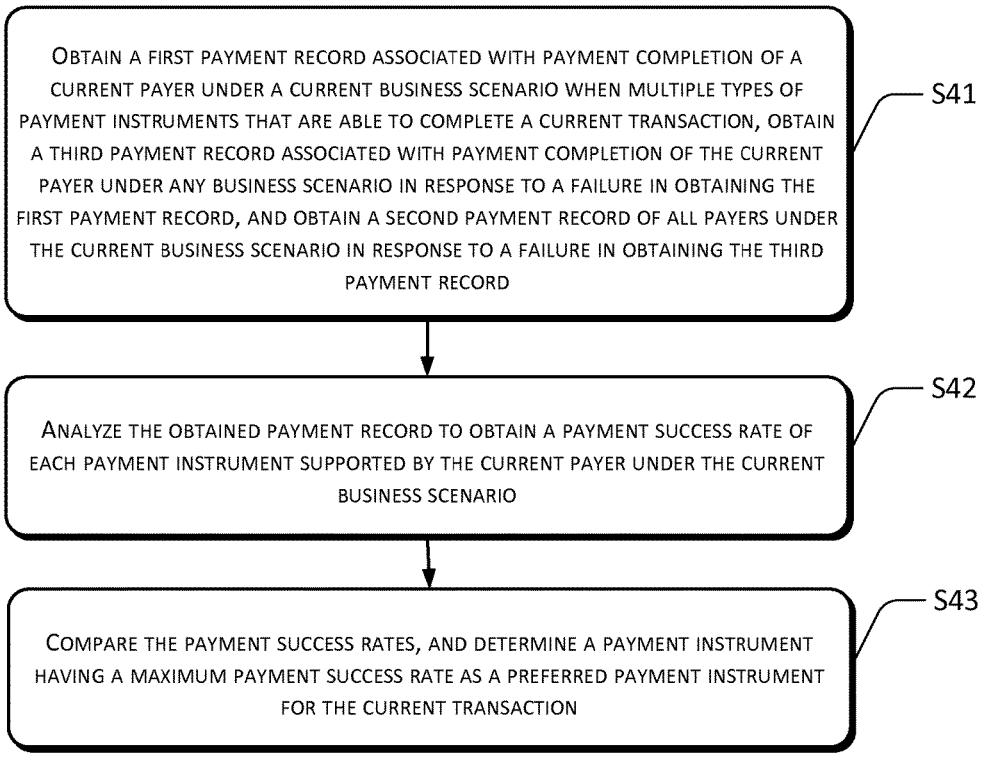
FIG. 4 is a flow chart illustrating a fourth example method of controlling a network payment in accordance with an embodiment of the present disclosure.

FIG. 4 is a flowchart illustrating a fourth method of controlling a network payment in accordance with an embodiment of the present disclosure.

Referring to FIG. 4, the method of controlling a network payment includes the following method blocks:

S41 obtains a first payment record associated with payment completion of a current payer under a current business scenario when multiple types of payment instruments that are able to complete a current transaction, obtains a third payment record associated with payment completion of the current payer under any business scenario in response to a failure in obtaining the first payment record, and obtains a second payment record of all payers under the current business scenario in response to a failure in obtaining the third payment record.

S42 analyzes the obtained payment record to obtain a payment success rate of each payment instrument supported by the current payer under the current business scenario.

If the first payment record is obtained, the first payment record is used as an analysis object. If the third payment record is obtained, the third payment record is used as an analysis object. If the second payment record is obtained, the second payment record is used as an analysis object.

S43 compares the payment success rates, and determines a payment instrument having a maximum payment success rate as a preferred payment instrument for the current transaction.

In the above embodiment of the present disclosure, a respective payer and a respective business scenario of each transaction in the first payment record are the same as those of the current transaction, so that a respective payment instrument of each transaction in the first payment record may be a payment instrument that is able to complete the current transaction. A preferred payment instrument of the current transaction is determined using the first payment record as a reference basis, which can avoid a phenomenon that a finally determined payment instrument is not supported by the payer or the business scenario of the current transaction, and ensure that the payment success probability of the finally determined payment instrument is the maximum in the current transaction.

For a payer who makes a transaction under the current business scenario for the first time, an acquisition of the first payment record fails because the first payment record does not exist. In this case, a payment record (i.e., the third payment record) of the payer of the current transaction under other business scenarios is used as a reference basis, thus ensuring that the finally determined preferred payment instrument is a most suitable payment instrument for the payer.

For a payer who does not perform any transaction operation, the first payment record and the third payment record do not exist. In this case, the preferred payment instrument of the transaction may be determined through a payment record of other payers under the current business scenario (i.e., the second payment record) as a reference basis. Since the second payment record exists with certainty, a phenomenon that the preferred payment instrument of the transaction cannot be determined due to a lack of a reference basis does not occur.

Figure 5:
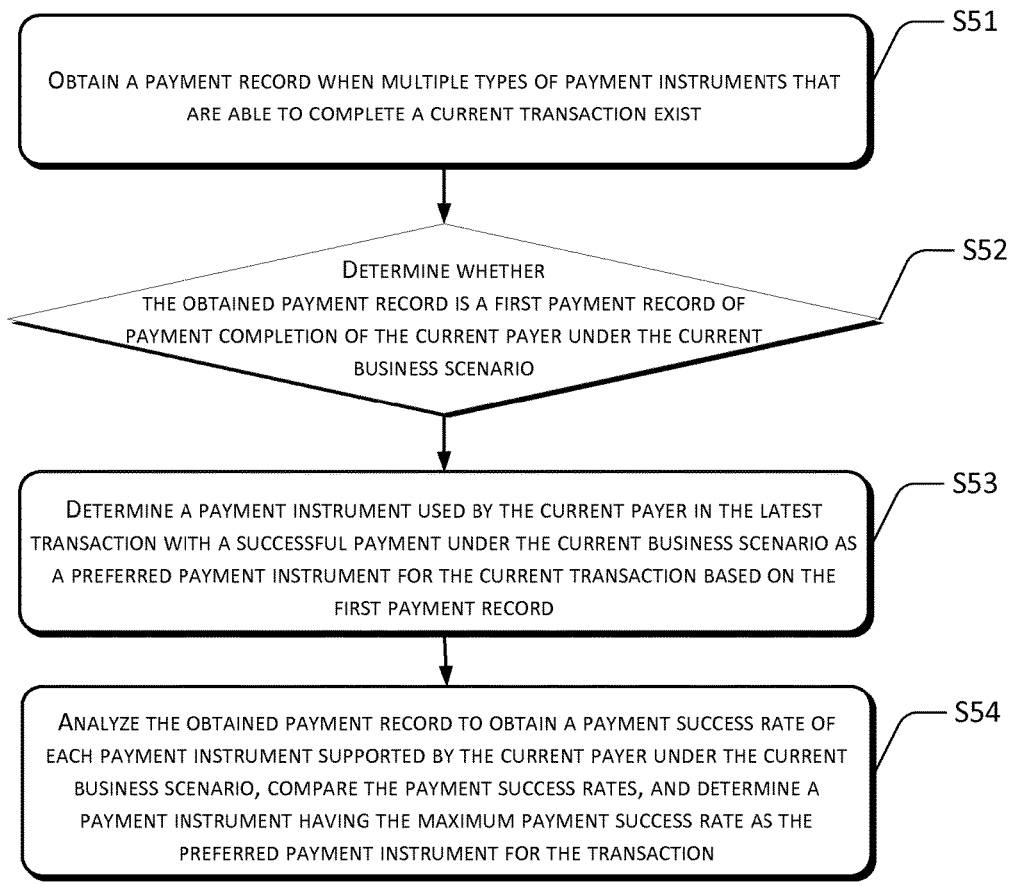
FIG. 5 is a flow chart illustrating a fifth example method of controlling a network payment in accordance with an embodiment of the present disclosure.

FIG. 5 is a flowchart of a fifth method of controlling a network payment in accordance with an embodiment of the present disclosure.

Referring to FIG. 5, the method of controlling a network payment control the following method blocks:

S51 obtains a payment record when multiple types of payment instruments that are able to complete a current transaction exist.

In an embodiment of the present disclosure, an attempt to obtain a first payment record associated with payment completion of a current payer under a current business scenario is made first. If the attempt to obtain a first payment record fails, in a possible implementation, a second payment record of all payers under the current business scenario may be obtained directly. In another possible implementation, an attempt to obtain a third payment record of payment completion of the current payer under any business scenario may be made first, and the second payment record of all the payers under the current business scenario is then obtained if the attempt to obtain a third payment record fails.

S52 determines whether the obtained payment record is a first payment record of payment completion of the current payer under the current business scenario. If affirmative, method block S53 is performed. Otherwise, method block S54 is performed.

S53 determines a payment instrument used by the current payer in the latest transaction with a successful payment under the current business scenario as a preferred payment instrument for the current transaction based on the first payment record.

If an attempt to obtain the first payment record is successful, this indicates that it is not the first time that the current payer has made a transaction under the current business scenario. Therefore, in order to ensure a payment success rate, the preferred payment instrument of the transaction is determined based on a transaction record of the current payer. In an embodiment of the present disclosure, a payment instrument used by the current payer in the latest transaction with a successful payment under the current business scenario is read from the first payment record, and this payment instrument is used directly as the preferred payment instrument of the transaction, without performing any statistics and calculation operations, which is simple and fast and is able to improve the transaction efficiency.

S54 analyzes the obtained payment record to obtain a payment success rate of each payment instrument supported by the current payer under the current business scenario, compares the payment success rates, and determines a payment instrument having the maximum payment success rate as the preferred payment instrument for the transaction.

In the above embodiment, when a first payment record associated with payment completion of the current payer under the current business scenario does not exist, a payment success rate of each payment instrument supported by the current payer under the current business scenario is calculated based on the second payment record or the third payment record, and a payment instrument having the maximum payment success rate is used as the preferred payment instrument for the transaction. When the first payment record is obtained, a payment instrument used by the current payer in the latest transaction with a successful payment under the current business scenario is used as the preferred payment instrument for the transaction directly, thus enabling determination of the preferred payment instrument for the transaction more quickly and improving the transaction efficiency.

Figure 6:
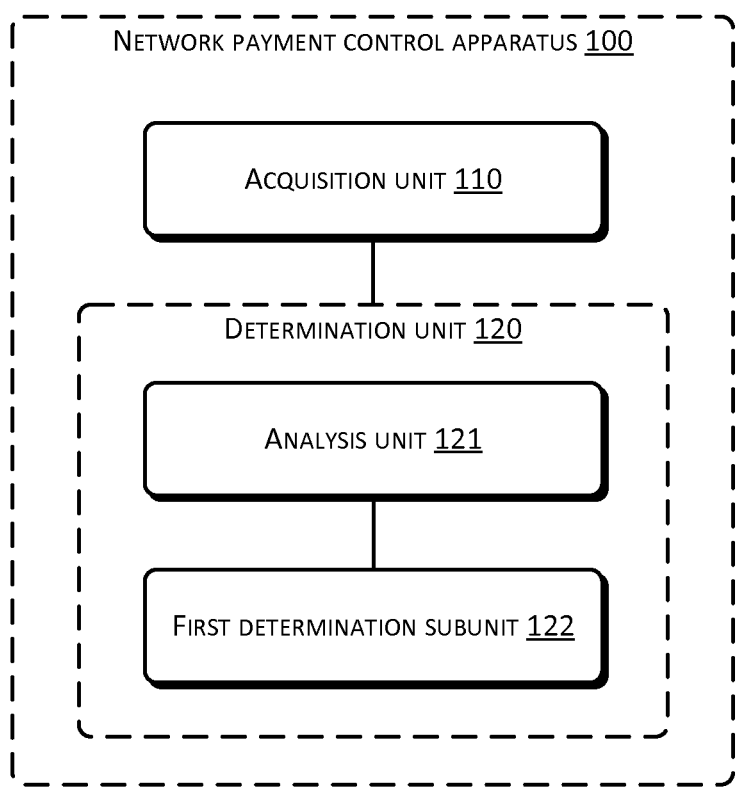
FIG. 6 is a structural block diagram of a first apparatus of controlling a network payment in accordance with an embodiment of the present disclosure.

FIG. 6 is a structural block diagram of a first network payment control apparatus 100 according to an embodiment of the present disclosure. The network payment control apparatus 100 may be a server.

Referring to FIG. 6, the network payment control apparatus 100 includes an acquisition unit 110 and a determination unit 120.

The acquisition unit 110 is configured to obtain a payment record when multiple types of payment instruments that are able to complete a current transaction exist.

The determination unit 120 is configured to determine a preferred payment instrument of the current transaction based on the obtained payment record.

The determination unit 120 includes an analysis unit 121 and a first determination subunit 122.

The analysis unit 121 is configured to analyze the payment record to obtain a payment success rate of each payment instrument supported by a current payer under a current business scenario.

The first determination subunit 122 is configured to compare the payment success rates, and determine a payment instrument having the maximum payment success rate as the preferred payment instrument for the current transaction.

As can be seen from the above technical solutions, the embodiments of the present disclosure obtain a payment record when a selection of a payment instrument is needed, and determine a preferred payment instrument for a current transaction based on the payment record. Specifically, a payment success rate of each payment instrument supported by a payer under a current business scenario may be obtained by analyzing the payment record, and a payment instrument having a maximum payment success rate is set as the preferred payment instrument of the transaction. Therefore, the embodiments of the present disclosure can implement an automatic selection of a payment instrument, reduce manual operations of a payer, simplify a payment process, and improve payment efficiency and transaction efficiency. In addition, using the payment instrument having the maximum payment success rate as the preferred payment instrument of the transaction may improve a success probability of a one-time payment to avoid a re-selection of payment instrument, thereby improving the payment efficiency and the transaction efficiency.

Figure 7:
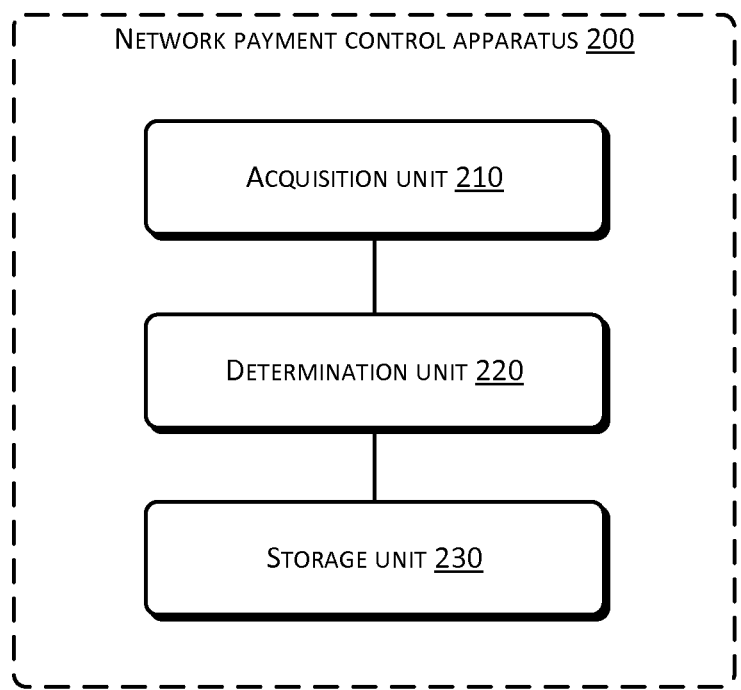
FIG. 7 is a structural block diagram of a second apparatus of controlling a network payment in accordance with an embodiment of the present disclosure.

FIG. 7 is a structural block diagram of a network payment control apparatus 200 according to an embodiment of the present disclosure. The network payment control apparatus 200 may be a server.

Referring to FIG. 7, the network payment control apparatus 200 includes an acquisition unit 210, a determination unit 220 and a storage unit 230.

The acquisition unit 210 is configured to obtain a payment record when multiple types of payment instruments that are able to complete a current transaction exist.

The determination unit 220 is configured to determine a preferred payment instrument of the current transaction based on the obtained payment record.

The storage unit 230 is configured to store a payment record of the current transaction after the current transaction is completed.

The payment record of the current transaction, after being stored, may be used as an analysis reference for subsequent transactions. The more payment records are stored, the higher a payment success rate of a determined payment instrument is.

Figure 8:
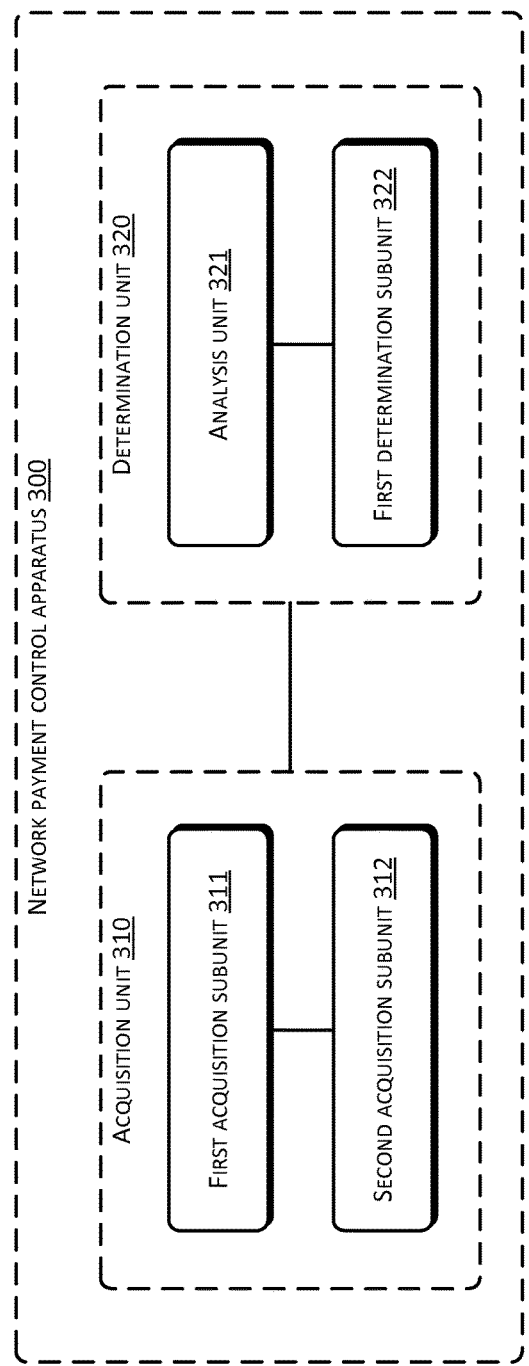
FIG. 8 is a structural block diagram of a third apparatus of controlling a network payment in accordance with an embodiment of the present disclosure.

FIG. 8 is a structural block diagram of a network payment control apparatus 300 according to an embodiment of the present disclosure. The network payment control apparatus 300 may be a server.

Referring to FIG. 8, the network payment control apparatus 300 includes an acquisition unit 310 and a determination unit 320.

The acquisition unit 310 is configured to obtain a payment record when there multiple types of payment instruments that are able to complete a current transaction exist.

The determination unit 320 is configured to determine a preferred payment instrument of the current transaction based on the obtained payment record.

The acquisition unit 310 includes a first acquisition subunit 311 and a second acquisition subunit 312.

The first acquisition subunit 311 is configured to obtain a first payment record associated with payment completion of a current payer under a current business scenario when multiple types of payment instruments that are able to complete the current transaction exist.

The second acquisition subunit 312 is configured to obtain a second payment record of all payers under the current business scenario if an attempt to obtain the first payment record fails.

The determination unit 320 includes an analysis unit 321 and a first determination subunit 322.

The analysis unit 321 is configured to analyze the payment record obtained by the acquisition unit 310 to obtain a payment success rate of each payment instrument supported by the current payer under the current business scenario.

The first determination subunit 322 is configured to compare the payment success rates, and determine a payment instrument having the maximum payment success rate as the preferred payment instrument for the current transaction.

The embodiment of the present disclosure determines a preferred payment instrument for a current transaction using a first payment record as a reference, thus avoiding a phenomenon that a finally determined payment instrument is not supported by a payer or a business scenario of the current transaction and ensuring the finally determined payment instrument to have the maximum payment success probability in the current transaction. When the first payment record does not exist, the preferred payment instrument for the current transaction is determined using a second payment record of other payers under the current business scenario as a reference. Because the second payment record exists for certainty, a phenomenon that the preferred payment instrument for the current transaction cannot be determined due to a lack of a reference does not occur.

Figure 9:
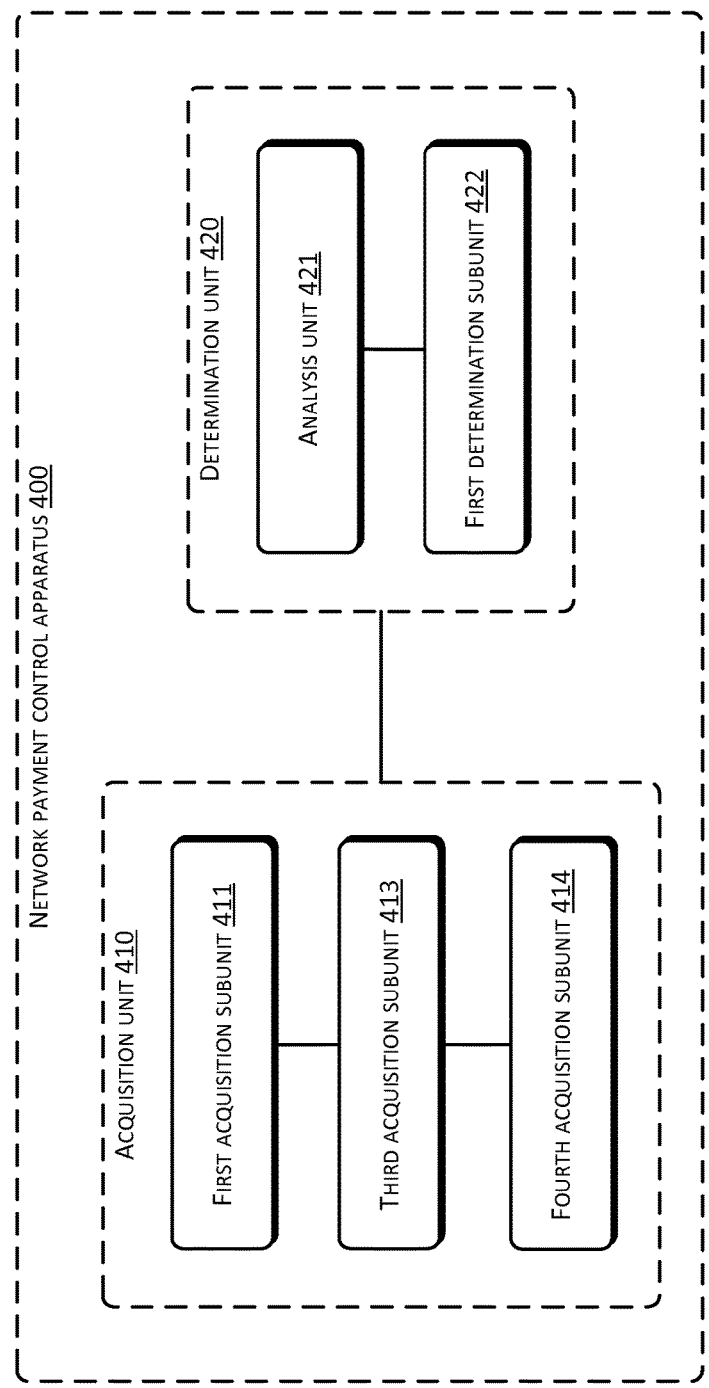
FIG. 9 is a structural block diagram of a fourth apparatus of controlling a network payment in accordance with an embodiment of the present disclosure.

FIG. 9 is a structural block diagram of a network payment control apparatus 400 according to an embodiment of the present disclosure. The network payment control apparatus 400 may be a server.

Referring to FIG. 9, the network payment control apparatus 400 includes an acquisition unit 410 and a determination unit 420.

The acquisition unit 410 is configured to obtain a payment record when multiple types of payment instruments that are able to complete a current transaction exist.

The determination unit 420 is configured to determine a preferred payment instrument for the current transaction based on the obtained payment record.

The acquisition unit 410 includes a first acquisition subunit 411, a third acquisition subunit 413 and a fourth acquisition subunit 414.

The first acquisition subunit 411 is configured to obtain a first payment record associated with payment completion of a current payer under a current business scenario when multiple types of payment instruments that are able to complete the current transaction exist.

The third acquisition subunit 413 is configured to obtain a third payment record associated with payment completion of the current payer under any business scenario if an attempt to obtain the first payment record fails.

The fourth acquisition subunit 414 is configured to obtain a second payment record of all payers under the current business scenario if an attempt to obtain the third payment record fails.

The determination unit 420 includes an analysis unit 421 and a first determination subunit 422.

The analysis unit 421 is configured to analyze the payment record obtained by the acquisition unit 410 to obtain a payment success rate of each payment instrument supported by the current payer under the current business scenario.

The first determination subunit 422 is configured to compare the payment success rates, and determine a payment instrument having the maximum payment success rate as the preferred payment instrument for the current transaction.

In the above embodiment of the present disclosure, a respective payer and a respective business scenario of each transaction in the first payment record are the same as those of the current transaction, so that a respective payment instrument of each transaction in the first payment record may be a payment instrument that is able to complete the current transaction. A preferred payment instrument of the current transaction is determined using the first payment record as a reference basis, which can avoid a phenomenon that a finally determined payment instrument is not supported by the payer or the business scenario of the current transaction, and ensure that the payment success probability of the finally determined payment instrument is the maximum in the current transaction. For a payer who makes a transaction under the current business scenario for the first time, an acquisition of the first payment record fails because the first payment record does not exist. In this case, the third payment record of the payer of the current transaction under other business scenarios is used as a reference basis, thus ensuring that the finally determined preferred payment instrument is a most suitable payment instrument for the payer. For a payer who does not perform any transaction operation, the first payment record and the third payment record do not exist. The second payment record is used as a reference basis, and a phenomenon that the preferred payment instrument of the transaction cannot be determined due to a lack of a reference basis does not occur.

Figure 10:
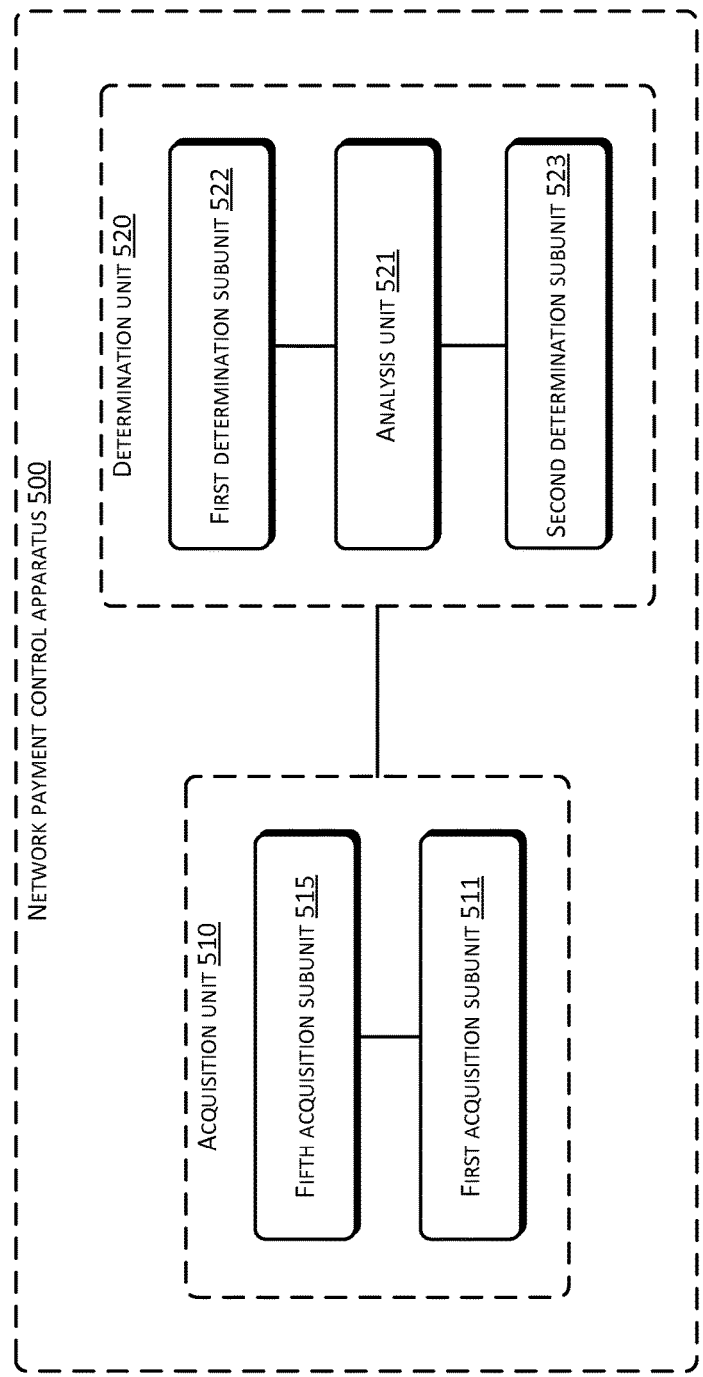
FIG. 10 is a structural block diagram of a fifth apparatus of controlling a network payment in accordance with an embodiment of the present disclosure.

FIG. 10 is a structural block diagram of a network payment control apparatus 500 according to an embodiment of the present disclosure. The network payment control apparatus 500 may be a server.

Referring to FIG. 10, the network payment control apparatus 500 includes an acquisition unit 510 and a determination unit 520.

The acquisition unit 510 is configured to obtain a payment record when multiple types of payment instruments that are able complete a current transaction exist. The determination unit 520 is configured to determine a preferred payment instrument for the current transaction based on the obtained payment record.

The acquisition unit 510 includes a first acquisition subunit 511 and a fifth acquisition subunit 515.

The first acquisition subunit 511 is configured to obtain a first payment record associated with payment completion of a current payer under a current business scenario when multiple types of payment instruments that are able complete the current transaction exist.

The fifth acquisition subunit 515 is configured to obtain a third payment record associated with payment completion of the current payer under any business scenario or obtain a second payment record of all payers under the current business scenario if the first acquisition subunit 511 fails to obtain the first payment record.

The determination unit 520 includes an analysis unit 521, a first determination subunit 522 and a second determination subunit 523.

The analysis unit 521 is configured to analyze the payment record obtained by the fifth acquisition subunit 515 to obtain a payment success rate of each payment instrument supported by the current payer under the current business scenario.

The first determination subunit 522 is configured to compare the payment success rates obtained by the analysis unit 521, and determine a payment instrument having the maximum payment success rate as the preferred payment instrument for the current transaction.

The second determination subunit 523 is configured to determine a payment instrument used by the current payer in the latest transaction with a successful payment under the current business scenario as the preferred payment instrument for the current transaction based on the first payment record obtained by the first acquisition subunit 511.

In the above embodiment, when a first payment record associated with payment completion of a current payer under a current business scenario does not exist, a payment success rate of each payment instrument supported by the current payer under the current business scenario is calculated based on a second payment record or a third payment record, and a payment instrument having the maximum payment success rate is used as a preferred payment instrument for a current transaction. When the first payment record is obtained, a payment instrument used by the current payer in the latest transaction with a successful payment under the current business scenario is used directly as the preferred payment instrument for the current transaction, thus enabling to determine the preferred payment instrument of the transaction more quickly.

For the apparatuses in the above embodiments, exemplary implementations of operations performed by various units have been described in detail in the method embodiments, which are not described in detail herein.

Figure 11:
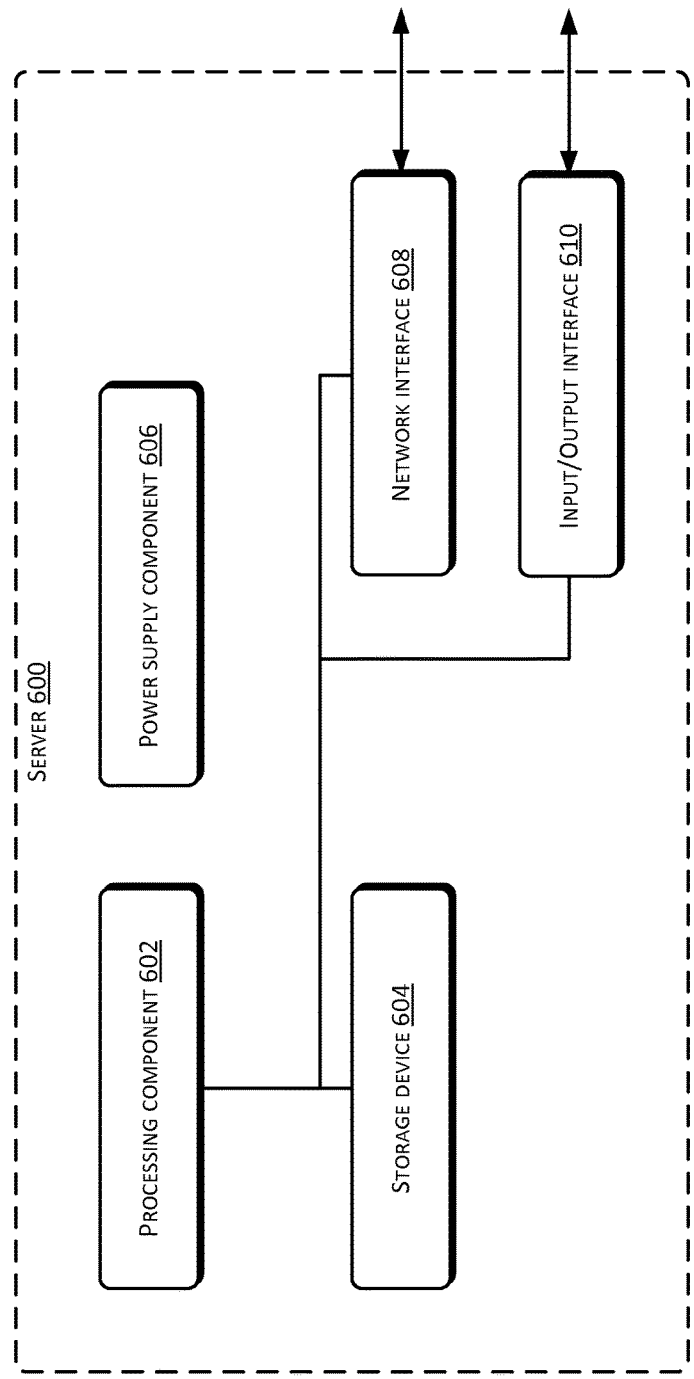
FIG. 11 is a schematic structural diagram of a server in accordance with an embodiment of the present disclosure.

FIG. 11 is a block diagram of a server 600 used for network payment control according to an exemplary embodiment. Referring to FIG. 11, the server 600 includes a processing component 602, which further includes one or more processors, and a storage resource represented by a storage device 604, which is configured to store instruction(s), for example, an application, executable by the processing component 602. The application stored in the storage device 604 may include one or more modules each corresponding to a set of instructions. Moreover, the processing component 602 is configured to execute the instructions to perform the above method(s) of controlling a network payment.

The server 600 may further include a power supply component 606 configured to perform power supply management of the server 600, a wired or wireless network interface 608 configured to connect the server 600 to a network, and an input/output (I/O) interface 610. The server 600 may operate an operating system, for example, Windows Server™, Mac OS X™, Unix™, Linux™, FreeBSD™, or the like, that is stored in the storage device 604.

The embodiments of the present disclosure further provide a non-volatile computer-readable storage media including instruction(s), for example, the storage device 604 which includes instructions. The instructions may be executed by the processing component 602 to implement the above network payment control method. By way of example, the non-volatile computer readable storage medium may include a ROM, a random access memory (RAM), a CD-ROM, a magnetic tape, a floppy disk, an optical data storage device, etc.

When the instructions in the non-volatile computer-readable storage media are executed by the processing component of the server, the server is able to perform a network payment control method. The method includes: obtaining a payment record when multiple types of payment instruments that are able to complete a current transaction; analyzing the payment record to obtain a payment success rate of each payment instrument supported by a current payer under a current business scenario; and comparing the payment success rates, and determining a payment instrument having the maximum payment success rate as the preferred payment instrument for the current transaction.

Figure 12:
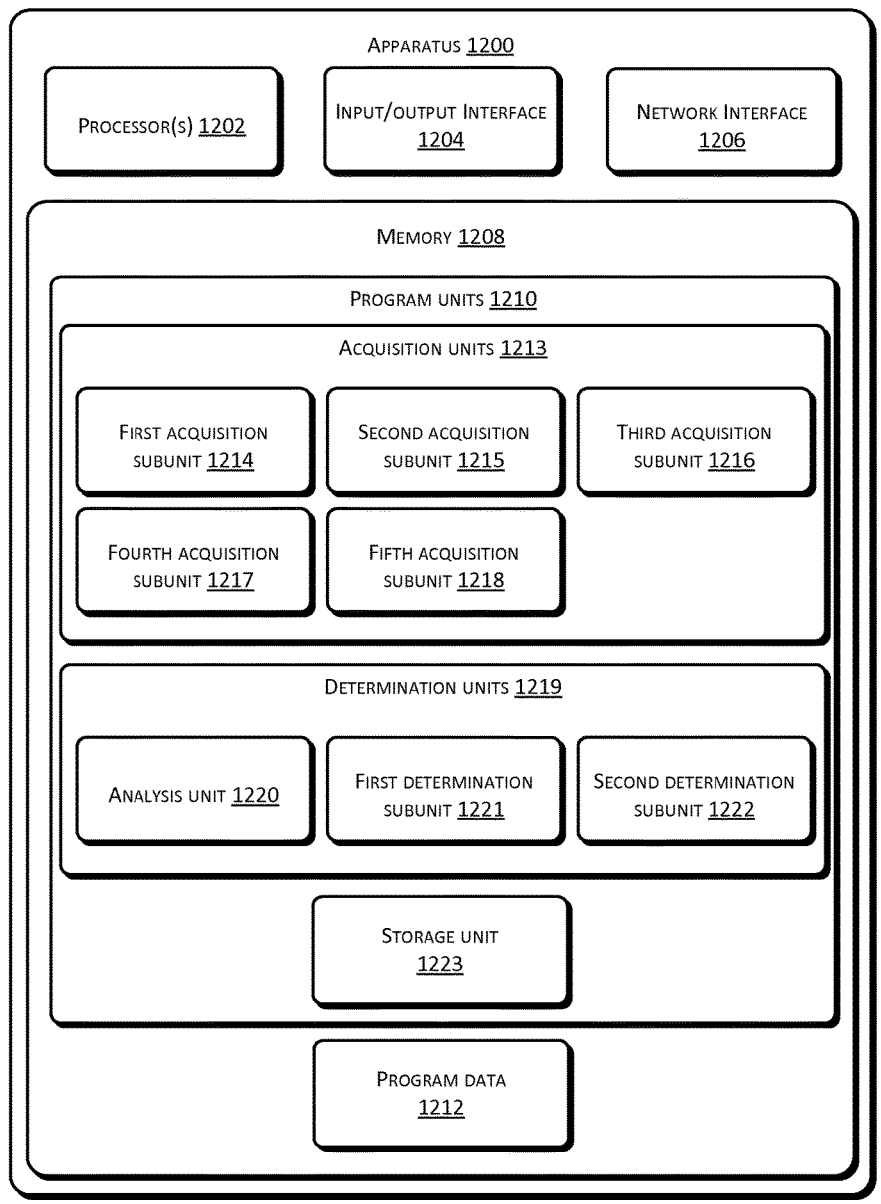
FIG. 12 is a schematic structural diagram of the example apparatus or server described in FIGS. 5-11 in more detail.

FIG. 12 shows an example apparatus 1200, such as the apparatuses 100-500 and the server 600 described in FIGS. 6-11 in more detail. In an embodiment, the apparatus 1200 may include one or more processors (CPUs) 1202, an input/output interface 1204, a network interface 1206 and memory 1208.

The memory 1208 may include a form of computer readable media such as volatile memory, Random Access Memory (RAM), and/or non-volatile memory, e.g., Read-Only Memory (ROM) or flash RAM, etc. The memory 1208 is an example of a computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an embodiment, the memory 1208 may include program units 1210 and program data 1212. The program units 1210 may include one or more units as described in the foregoing embodiments. For example, the program units 1210 may include one or more of an acquisition unit 1213 (which may include a first acquisition subunit 1214, a second acquisition subunit 1215, a third acquisition subunit 1216, a fourth acquisition subunit 1217 and/or a fifth acquisition subunit 1218), a determination unit 1219 (which may include an analysis unit 1220, a first determination subunit 1221 and/or a second determination subunit 1222), and a storage unit 1223. Details of these units have been described in the foregoing embodiments, and are therefore not repeatedly described herein.

It should be noted that relational terms described herein, such as "first" and "second", etc., are used solely to distinguish one entity or operation from another entity or operation without necessarily requiring or implying any existence of such relationship or ordering between these entities or operations in reality. Moreover, terms such as "comprise", "include" and any other variants thereof are intended to cover a non-exclusive inclusion. A process, method, product or device that includes a series of elements not only includes those elements, but also includes other elements that are not explicitly listed, or further includes elements that already existed in such process, method, product or device. In a condition without further limitations, an element defined by a phrase "include a/an . . . " does not exclude any other similar elements from existing in the process, method, product or device.

The above descriptions are merely exemplary implementations of the present disclosure to enable one skilled in the art to understand or implement the present disclosure. Modifications made to these embodiments are obvious to one skilled in the art, and the general principle defined herein may be embodied in other embodiments without departing from the spirit or scope of the present disclosure. Therefore, the present disclosure is not limited to these embodiments described herein, but is consistent with the broadest scope of the principle and innovative features disclosed herein.

What is claimed is:

1. A method implemented by a network payment control server which includes one or more processors and a memory, the method comprising:
    obtaining a payment record when multiple types of payment instruments that are able to complete a current transaction exist, obtaining the payment record comprising:
        attempting to obtain a first payment record associated with payment completion of a current payer under a current business scenario;
        attempting to obtain a second payment record associated with payment completion of the current payer under any business scenario in response to a failure in obtaining the first payment record; and
        obtaining a third payment record of all payers under the current business scenario in response to a failure in obtaining the second payment record; and
    determining a preferred payment instrument for the current transaction based at least in part on the obtained payment record, determining the preferred payment instrument for the current transaction comprising:
        if the first payment record is obtained, identifying a payment instrument that is used by the current payer in a latest transaction with a successful payment from the first payment record, and directly using the payment instrument that is used by the current payer in the latest transaction with the successful payment as the preferred payment instrument for the current transaction without performing any statistical operations; and
        if the first payment record is not obtained in response to no transaction associated with the current payer in the first payment record, then obtaining and analyzing the second payment record to obtain respective payment success rates of payment instruments supported by the current payer under any business scenario;

if the second payment record is not obtained in response to no transaction associated with the current payer in the second payment record, then analyzing the third payment record to obtain respective payment success rates of payment instruments supported by all the payers under the current business scenario;

in response to successfully obtaining and analyzing either the second or third payment record, comparing the respective payment success rates for the respective payment record obtained and analyzed, and determining a payment instrument having a maximum payment success rate as the preferred payment instrument for the current transaction, wherein if the first or second payment record is obtained, the preferred payment instrument is automatically selected by the network payment control server to complete the current transaction, and if the third payment record is obtained, the preferred payment instrument is presented as a most suitable payment instrument to the current payer in order to complete the current transaction.

2. The method of claim 1, further comprising storing a new payment record for the current transaction upon completion of the transaction.

3. An apparatus comprising:
one or more processors;
memory storing executable instructions that, when executed by the one or more processors, cause the one or more processors to perform acts comprising:
obtaining a payment record when multiple types of payment instruments that are able to complete a current transaction exist, obtaining the payment record comprising:
attempting to obtain a first payment record associated with payment completion of a current payer under a current business scenario;
attempting to obtain a second payment record associated with payment completion of the current payer under any business scenario in response to a failure in obtaining the first payment record; and
obtaining a third payment record of all payers under the current business scenario in response to a failure in obtaining the second payment record; and
determining a preferred payment instrument for the current transaction based at least in part on the obtained payment record, wherein determining the preferred payment instrument comprises:
if the first payment record is obtained, identifying a payment instrument that is used by the current payer in a latest transaction with a successful payment from the first payment record, and directly using the payment instrument that is used by the current payer in the latest transaction with the successful payment as the preferred payment instrument for the current transaction without performing any statistical operations; and
if the first payment record is not obtained in response to no transaction associated with the current payer in the first payment record, then obtaining and analyzing the second payment record to obtain respective payment success rates of payment instruments supported by the current payer under any business scenario;

if the second payment record is not obtained in response to no transaction associated with the current payer in the second payment record, then analyzing the third payment record to obtain respective payment success rates of payment instruments supported by all the payers under the current business scenario;

in response to successfully obtaining and analyzing either the second or third payment record, comparing the respective payment success rates for the respective payment record obtained and analyzed, and determining a payment instrument having a maximum payment success rate as the preferred payment instrument for the current transaction, wherein if the first or second payment record is obtained, the preferred payment instrument is automatically selected by the network payment control server to complete the current transaction, and if the third payment record is obtained, the preferred payment instrument is presented as a most suitable payment instrument to the current payer in order to complete the current transaction.

4. The apparatus of claim 3, wherein the acts further comprise storing a new payment record for the current transaction upon completion of the current transaction.

5. One or more computer-readable media storing executable instructions that, when executed by one or more processors, cause the one or more processors to perform acts comprising:
obtaining a payment record when multiple types of payment instruments that are able to complete a current transaction exist, obtaining the payment record comprising:
attempting to obtain a first payment record associated with payment completion of a current payer under a current business scenario;
attempting to obtain a second payment record associated with payment completion of the current payer under any business scenario in response to a failure in obtaining the first payment record; and
obtaining a third payment record of all payers under the current business scenario in response to a failure in obtaining the second payment record; and
determining a preferred payment instrument for the current transaction based at least in part on the obtained payment record, determining the preferred payment instrument for the current transaction comprising:
if the first payment record is obtained, identifying a payment instrument that is used by the current payer in a latest transaction with a successful payment from the first payment record, and directly using the payment instrument that is used by the current payer in the latest transaction with the successful payment as the preferred payment instrument for the current transaction without performing any statistical operations; and
if the first payment record is not obtained in response to no transaction associated with the current payer in the first payment record, then obtaining and analyzing the second payment record to obtain respective payment success rates of payment instruments supported by the current payer under any business scenario;
if the second payment record is not obtained in response to no transaction associated with the current payer in the second payment record, then analyzing the third payment record to obtain respective payment success rates of payment instruments supported by all the payers under the current business scenario;

in response to successfully obtaining and analyzing either the second or third payment record, comparing the respective payment success rates for the respective payment record obtained and analyzed, and determining a payment instrument having a maximum payment success rate as the preferred payment instrument for the current transaction, wherein if the first or second payment record is obtained, the preferred payment instrument is automatically selected by the network payment control server to complete the current transaction, and if the third payment record is obtained, the preferred payment instrument is presented as a most suitable payment instrument to the current payer in order to complete the current transaction.

6. The one or more computer-readable media of claim 5, the acts further comprising storing a new payment record of the current transaction upon completion of the transaction.

* * * * *